United States Patent
Eardley et al.

(10) Patent No.: US 10,822,222 B2
(45) Date of Patent: Nov. 3, 2020

(54) SYSTEMS AND METHODS FOR TRANSPORTATION OF WAXY CRUDE

(71) Applicant: TYR Energy Utah Logistics, LLC, a Texas limited liability company, Corpus Christi, TX (US)

(72) Inventors: Kip Eardley, Corpus Christi, TX (US); Michael Walter, Corpus Christi, TX (US)

(73) Assignee: TYR ENERGY UTAH LOGISTICS, LLC, A TEXAS LIMITED LIABILITY COMPANY, Corpus Christi, TX (US)

( * ) Notice: Subject to any disclaimer, the term of this patent is extended or adjusted under 35 U.S.C. 154(b) by 0 days.

(21) Appl. No.: 16/460,019

(22) Filed: Jul. 2, 2019

(65) Prior Publication Data
US 2020/0002157 A1 Jan. 2, 2020

Related U.S. Application Data

(60) Provisional application No. 62/693,012, filed on Jul. 2, 2018.

(51) Int. Cl.
| | | |
|---|---|---|
| *C10G 73/40* | (2006.01) | |
| *B67D 7/82* | (2010.01) | |
| *B67D 7/02* | (2010.01) | |
| *B67D 7/32* | (2010.01) | |
| *B65D 88/12* | (2006.01) | |
| *B65D 90/00* | (2006.01) | |
| *B65D 88/74* | (2006.01) | |
| *B65D 90/04* | (2006.01) | |

(52) U.S. Cl.
CPC .............. *B67D 7/82* (2013.01); *B65D 88/128* (2013.01); *B65D 88/129* (2013.01); *B65D 88/74* (2013.01); *B65D 90/0033* (2013.01); *B65D 90/046* (2013.01); *B67D 7/0205* (2013.01); *B67D 7/3281* (2013.01); *C10G 73/40* (2013.01); *C10G 2300/1085* (2013.01); *C10G 2300/4062* (2013.01); *C10G 2300/4068* (2013.01)

(58) Field of Classification Search
CPC .... B65D 88/128; B65D 88/129; B65D 88/74; B65D 90/0033; B65D 90/046; B67D 7/0205; B67D 7/3281; B67D 7/82; C07D 471/04; C10G 2300/1085; C10G 2300/4062; C10G 2300/4068; C10G 73/40
See application file for complete search history.

(56) References Cited

U.S. PATENT DOCUMENTS

2006/0065573 A1* 3/2006 Dieckmann .............. C10G 2/32
208/21

* cited by examiner

*Primary Examiner* — Sharon Pregler
(74) *Attorney, Agent, or Firm* — Maschoff Brennan; Jonathan M. Benns

(57) ABSTRACT

A method of transporting waxy crude hydrocarbon includes: providing a container having an internal chamber with at least one port for receiving flowable waxy crude, wherein the container is provided at a refinery location; filling the internal chamber of the container with a filling system for loading the waxy crude hydrocarbon into the container; allowing the waxy crude hydrocarbon to cool and solidify into a non-flowable state; transporting the container having the non-flowable waxy crude hydrocarbon with at least one transport vehicle, wherein the transporting is performed without actively heating the waxy crude hydrocarbon with an active heating system, wherein the transporting is along a transportation route having a beginning at the refinery location and an ending; heating the waxy crude hydrocarbon at the ending of the transportation route until flowable; and removing the flowable waxy crude hydrocarbon from the container with an emptying system.

20 Claims, 3 Drawing Sheets

SYSTEMS AND METHODS FOR TRANSPORTATION OF WAXY CRUDE

CROSS-REFERENCE

This patent application claims priority to U.S. Provisional Application No. 62/693,012 filed Jul. 2, 2018, which provisional is incorporated herein by specific reference in its entirety.

BACKGROUND

Previously, waxy crude hydrocarbon/petroleum that is obtained from the hydrocarbon formations of the Uintah Basin in Utah, USA is received from processing in a hot and liquid state, and then transferred to heated containers that are vented for shipping to a local refinery facility in order to make retail products. However, a significant problem is that the hot and liquid state of the waxy crude hydrocarbon/petroleum evolves aromatic gases or volatile organic compounds (VOCs) that reduce the ability to make retail products. In part, instead of being able to make a product from the aromatic gases or VOCs, the gases are vented into the atmosphere during the transportation to the local refinery facility. The content of this type of waxy crude hydrocarbon/petroleum is unique in its properties, as is most crude obtained from different locations all over the world. As such, one methodology of obtaining crude hydrocarbon/petroleum and processing it into a retail product with the origin in one location may not apply well to crude hydrocarbon/petroleum obtained at a different location.

Thus, there needs to be different methodologies for receiving crude hydrocarbon/petroleum at a source location and transferring the crude hydrocarbon/petroleum to a refinery facility for different sources of crude hydrocarbon/petroleum.

SUMMARY

In some embodiments, a system for transporting waxy crude/waxy petroleum can include: a container having an internal chamber with at least one port, and having a frame around the container, the container being configured for receiving flowable waxy crude/waxy petroleum into the internal chamber, wherein the container is devoid of an active heating system; a refinery location configured for producing the waxy crude/waxy petroleum; a filling system at the refinery location that is configured for loading the waxy crude/waxy petroleum into the container; non-flowable waxy crude/waxy petroleum in the container; at least one transport vehicle configured to carry the container; a transportation route having a beginning at the refinery location and an ending; and an emptying system at the ending of the transportation route, the emptying system comprising a heating system configured to heat the non-flowable waxy crude/waxy petroleum into a flowable state. In some aspects, the system can include a lift system and at least one second transport vehicle, wherein the lift system and the at least one second transport vehicle are located at a transfer location. In some aspects, the system can include an active heating system at the emptying system. In some aspects, the container includes a passive heating system. In some aspects, the waxy crude/waxy petroleum is refined from formations of Uintah Basin, Utah, which is the beginning of the transportation route. In some aspects, the filling system and/or emptying system includes at least one pump and at least one hose for loading the flowable waxy crude/waxy petroleum into the container, and each may optionally include a heating system.

In some embodiments, a method of transporting waxy crude/waxy petroleum can include: providing a container having an internal chamber with at least one port, and having a frame around the container, the container being configured for receiving flowable waxy crude into the internal chamber, wherein the container is provided at a refinery location configured for producing the waxy crude/waxy petroleum; filling the internal chamber of the container with a filling system configured for loading the waxy crude/waxy petroleum into the container; allowing the waxy crude/waxy petroleum to cool and solidify into a non-flowable state; transporting the container having the non-flowable waxy crude/waxy petroleum with at least one transport vehicle configured to carry the container, wherein the transporting is performed without actively heating the waxy crude/waxy petroleum with an active heating system, wherein the transporting is along a transportation route having a beginning at the refinery location and an ending; heating the waxy crude/waxy petroleum at the ending of the transportation route until flowable; and removing the flowable waxy crude/waxy petroleum from the container with an emptying system at the ending of the transportation route. In some aspects, the at least one transport vehicle includes a trailer or rail car having a flat carrier bed. In some aspects, after filling the container with the waxy crude/waxy petroleum, the method includes sealing the container so as to be airtight.

In some embodiments, the method can include lifting the container having the waxy crude/waxy petroleum from a first transport vehicle with a lift system and placing the container having the waxy crude/waxy petroleum on a second transport vehicle, wherein the lift system lifts the container having the waxy crude/waxy petroleum at a transfer location. In some aspects, the method can include forming a stack of a plurality of containers or an array of a plurality of containers, wherein the plurality of containers are coupled together, wherein the stack optionally is on the at least one transport vehicle.

In some embodiments, the method can include operating an active heating system at the emptying system so as to heat the non-flowable waxy crude/waxy petroleum into flowable waxy crude/waxy petroleum. In some aspects, the method can include heating the container with a passive heating system during transport or at the emptying system, which passive heating system includes at least one of: a dark exterior on at least one surface of the container; a dark cover; a dark tent; a dark tarp; a dark frame; a dark outer container; or the like, wherein the dark is a color selected from black, dark grey, charcoal, brown, purple, blue, or combinations thereof.

In some embodiments, the method can include receiving the waxy crude/waxy petroleum from the refinery location, which includes a refinery configured for producing the waxy crude/waxy petroleum from Uintah Basin, Utah. The chemical characteristics of the waxy crude/waxy petroleum from the Uintah Basin, Utah are unique, which allows for the present invention to transport it while not actively heated (e.g., non-flowable state).

In some embodiments, the method includes operating the filling system by operating at least one pump and at least one hose for loading the waxy crude/waxy petroleum into the container. In some aspects, the filling system includes a heating system configured to heat the waxy crude/waxy petroleum so as to be flowable.

In some embodiments, the transportation route includes: one or more roads between the beginning and ending; one or more rail lines between the beginning and ending; one or more waterway travel routes between the beginning and ending; one or more ocean travel routes between the beginning and ending; or combination thereof.

In some embodiments, the method can include operating an active heating system at the emptying system so as to heat the waxy crude/waxy petroleum to a flowable state. In some aspects, the method can include: the active heating system heating the body of the container; and/or one or more heating members are inserted through a port of the container so as to heat the waxy crude/waxy petroleum by direct heat contact. In some aspects, the method can include maintaining the non-flowable waxy crude/waxy petroleum in the internal chamber during the transportation from the beginning to the ending.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
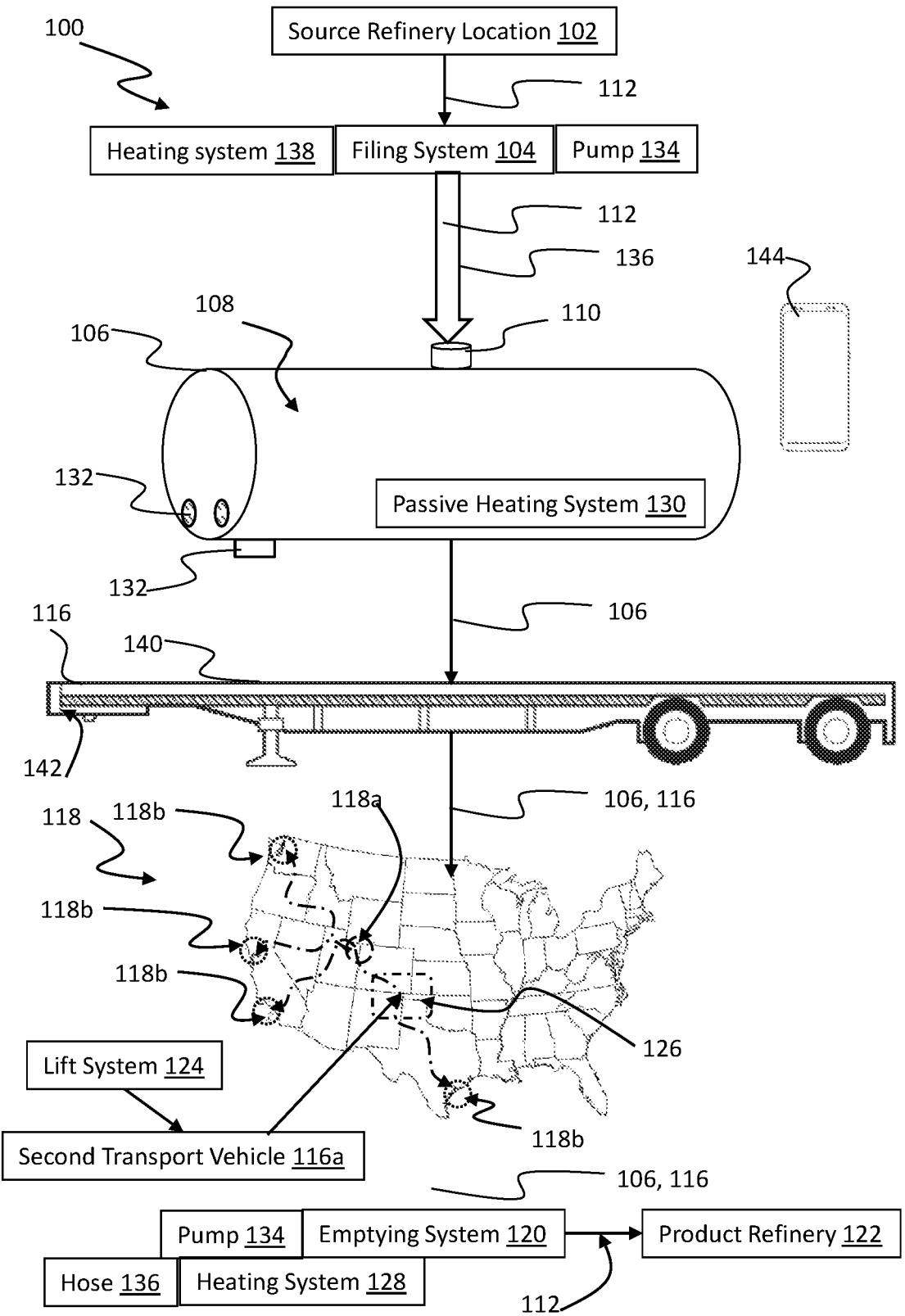
FIG. 1 is a schematic of a system and method for introducing flowable waxy crude/waxy petroleum into a non-heated liquid container, allowing the waxy crude/waxy petroleum to cool and solidify in the non-heated liquid container, transporting the non-heated liquid container having the solidified waxy crude/waxy petroleum, and extracting the waxy crude/waxy petroleum from the container by heating until in a liquid flowable state.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present disclosure relates to systems and methods for transporting waxy crude/waxy petroleum in a solidified state within a container configured for liquids. Additionally, the present disclosure relates to systems and methods for introducing flowable waxy crude/waxy petroleum into a non-heated liquid container, allowing the waxy crude/waxy petroleum to cool and solidify in the non-heated liquid container, transporting the non-heated liquid container having the solidified waxy crude/waxy petroleum, and extracting the waxy crude/waxy petroleum from the container by heating until in a liquid flowable state.

Now, it has been realized that it is possible to load liquid waxy crude/waxy petroleum from the Uintah Basin in Utah, which is hereinafter the waxy crude/waxy petroleum (e.g., 112) defined herein, into a common non-heated liquid container and ship the common non-heated liquid container to any refinery facility in any location and still be capable of producing the retail products. Also, the common non-heated liquid container can be sealed and be airtight so as to retain the aromatics without evolving aromatic gases or VOCs, in part due to the lower temperature and the sealed container. Surprisingly and unexpectedly, heating the cooled waxy crude/waxy petroleum into a flowable state for extraction from the container is easy and economic. Thus, by loading waxy crude/waxy petroleum into a common non-heated liquid container, optionally sealed, lower loss of aromatics or VOCs can be achieved, which provides for greater product generation at the refinery facility. Thus, by merely allowing the waxy crude/waxy petroleum to cool during transport, optionally sealed, more product can be achieved with less loss. This is a benefit to the environment by reducing aromatic or VOC emissions, and an economic benefit of obtaining more quantities of products, and possibly a greater array of products.

In one embodiment, the non-heated liquid container can be allowed to reach equilibrium with ambient conditions, whether sealed or unsealed, which may be the ambient temperature and optionally ambient pressure. In one aspect, the non-heated liquid container can allow the waxy crude/waxy petroleum to have reduced flowability, thicken, and optionally become a solid. Thus, the transportation can be devoid of active heating. As used herein, "active heating" occurs when an electric heater or fuel burning heater is used to maintain or achieve an elevated temperature above the ambient temperature, which is omitted during transport. As used herein, "passive heating" occurs when the ambient conditions and/or external environment and/or sun and/or outside temperature cause heating of the non-heated liquid container and/or waxy crude/waxy petroleum located therein. The state of the waxy crude/waxy petroleum can be any state from solid to gelatinous to flowable to liquid during transportation so long as no active heating is used. Preferably, the waxy crude/waxy petroleum solidifies into a non-flowable state, such as a thick gelatinous substance or a solid. The thick gelatinous substance can be substantially solid and non-flowable. Thus, the waxy crude/waxy petroleum can be allowed to cool to a non-flowable state within the non-heated liquid container.

In one aspect, active heating may optionally be used at the refinery facility in order to change the waxy crude/waxy petroleum into a flowable state, such as a liquid, and to remove the waxy crude/waxy petroleum from the non-heated liquid container. The active heating can use artificial energy, such as electricity or fuel burning. In one example, the heating can be by steam heating and using steam to melt the waxy crude/waxy petroleum for extraction from the non-heated liquid container. An electric heating blanket, or plurality thereof, may also be used to heat the non-heated liquid container and thereby heat the waxy crude/waxy petroleum so as to be flowable.

In one aspect, only passive heating is used at the refinery facility in order to remove the waxy crude/waxy petroleum from the non-heated liquid container. The passive heating can use environmental heating, such as from the sun or air, without using any artificial energy. An example of passive heating is using a coating on the container that is a dark (e.g., black or charcoal) color, or using a tarp of a dark color to cover the container to create a heated environment around the container.

Combinations of active and passive heating may be used at the refinery location.

In one aspect, the ability to allow the waxy crude/waxy petroleum to cool in the non-heated liquid container allows for longer transportation distances from the source of the waxy crude/waxy petroleum (e.g., refined partially, but not yet product) to the refinery location that processes the waxy crude/waxy petroleum into the products. In fact, the transportation distance may be to any location in the world, such as Texas (e.g., Corpus Christi), California, China, Singapore, or any location in North America, Central America, South America, Asia, Australia, Africa, Europe, or any other location or specific location in any continent or any island on planet Earth. Once at the refinery location, the waxy crude/waxy petroleum is heated, actively or passively, into a flowable format, such as liquid, and extracted from the non-heated liquid container.

In one aspect, the technology described herein allows for the waxy crude/waxy petroleum to be loaded into a non-heated liquid container and allowed to solidify and sit indefinitely. While solid, no VOCs are generated or lost, especially when the container is sealed. Currently, heated waxy crude/waxy petroleum is transported to a local refinery location as soon as possible to reduce the economic expenditure required for heating all the way to the refinery. Now, the non-heated liquid container having the waxy crude/waxy petroleum in any state can be set and stored for any amount of time. This allows for a number of non-heated liquid containers to be accumulated that are filled with the waxy crude/waxy petroleum, and then a strategic shipping methodology can be created to ship one or more of the non-heated liquid containers having the waxy crude/waxy petroleum. This allows for the one or more non-heated liquid containers to be loaded onto one or more flatbeds (e.g., semi truck) so as to have one or more non-heated liquid containers on each flatbed. Then, all of the non-heated liquid containers can be transported to a railyard and moved onto flatbed railcars. This allows an accumulation of a plurality of non-heated liquid containers to be shipped on the same train on one or more railcars to the distant refinery location. For example, during any weather, including rain, snow, wind, sunshine or other, the non-heated liquid containers can be stored and accumulated until a critical number of non-heated liquid containers are obtained having the solidified waxy crude/waxy petroleum before being transported from the source location and/or transported in any of the weather conditions as described herein.

In one embodiment, the methodologies described herein can include determining the weather and in response continuing to acquire non-heated liquid containers that are empty and filling the non-heated liquid containers with waxy crude/waxy petroleum no matter what the weather is, and optionally storing the non-heated liquid containers if a road or transportation route is closed, congested, or otherwise non-optimal.

In one embodiment, the non-heated liquid containers having waxy crude/waxy petroleum can be transported from the source to a warehouse for storage during the transportation, and then removed from the warehouse and actively transported in any weather. As such, the source refinery that produces the waxy crude/waxy petroleum can stay in operation in any weather including rain and snow, because the non-heated liquid containers can be stored at any temperature in any location between the source and destination.

In one embodiment, the plurality of non-heated liquid containers can include four or more non-heated liquid containers stacked on a flatbed, whether truck or train flatbed.

In one embodiment, the waxy crude/waxy petroleum can solidify and set up in a solid stable shape form. The solid stable shape form can be any shape; however, it should be recognized that the shape can be the same as the internal chamber shape of the non-heated liquid container.

In one embodiment, after the waxy crude/waxy petroleum is removed from the non-heated liquid container, the internal chamber thereof may be cleaned so that it can be used to haul a different product to a different location. The cleaning may be by any method. In one example, steam cleaning can be performed to clean the internal chamber.

In one embodiment, once the non-heated liquid container is cleaned of the removed waxy crude/waxy petroleum, another liquid can be filled into the non-heated liquid container to haul back to the source of the waxy crude/waxy petroleum. For example, a hydrocarbon product, such as oil, diesel, gasoline, or other, may be used to refill the non-heated liquid container for transportation back to the source for use in the process of making the waxy crude/waxy petroleum from Uintah Basin.

Figure 2A:
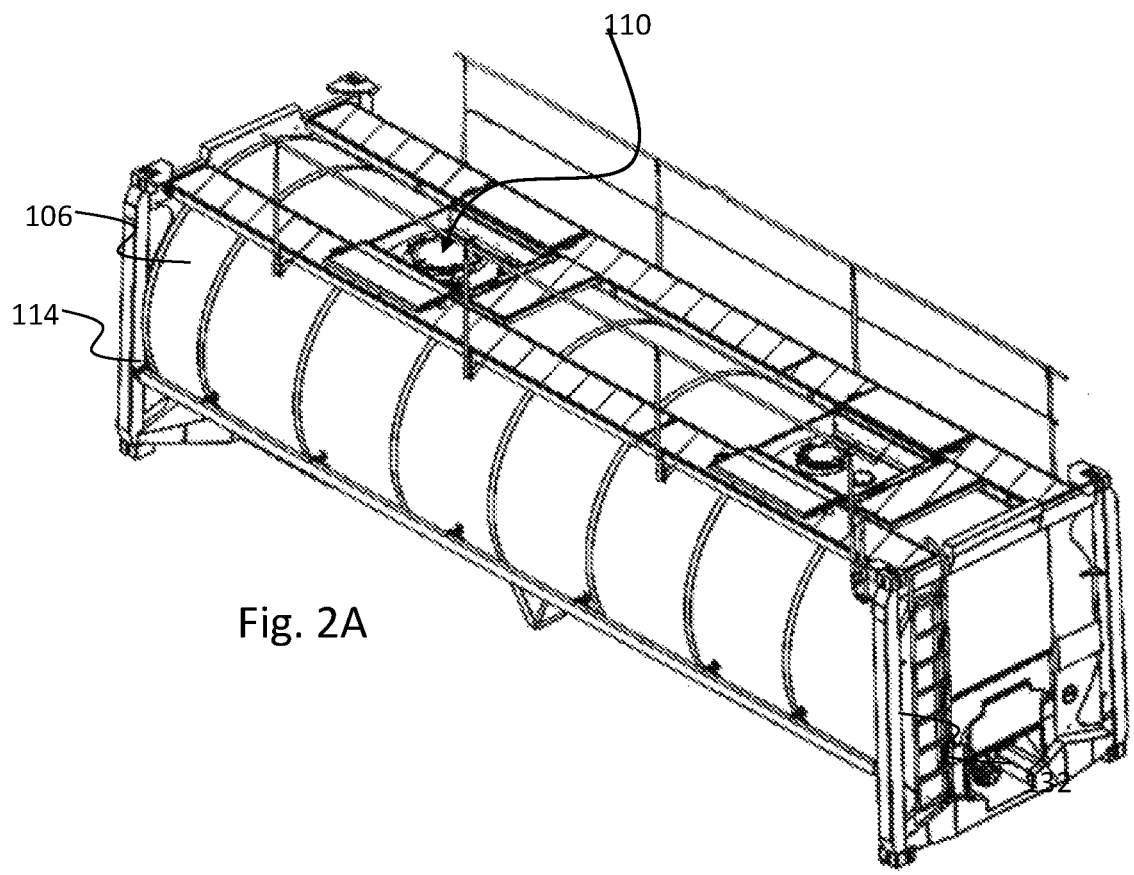
FIGS. 2A-2B illustrate an embodiment of a non-heated liquid container.
Figure 2B:
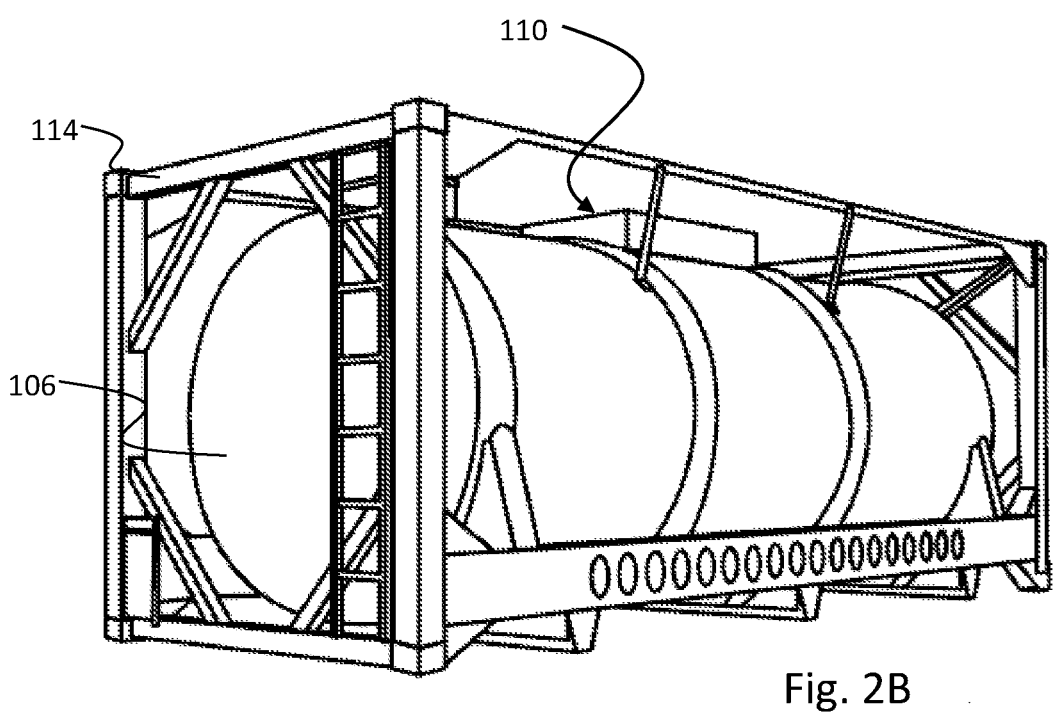
Figure 3A:
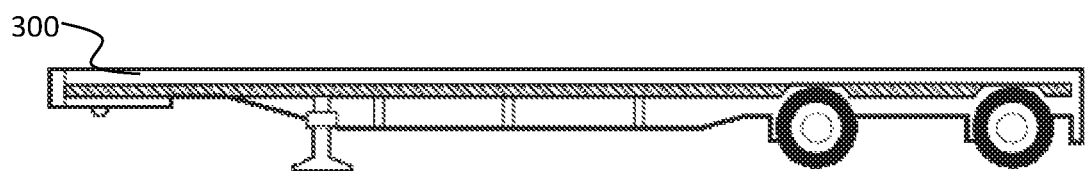
FIG. 3A illustrates an embodiment of a flatbed trailer that can haul a non-heated liquid container having solidified waxy crude/waxy petroleum therein.
Figure 3B:
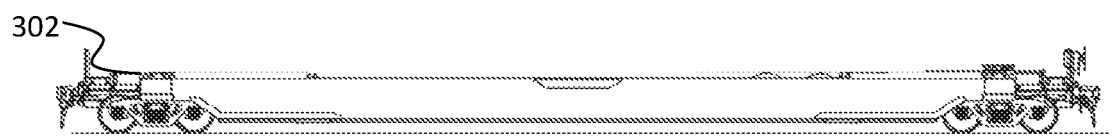
FIG. 3B illustrates an embodiment of a train flatbed that can haul a non-heated liquid container having solidified waxy crude/waxy petroleum therein.

FIG. 1 shows a system 100 for transporting waxy crude 112. As shown, the system 100 can include a container 106 having an internal chamber 108 with at least one port (e.g., top port 110). The container 106 can also include a frame 114 around the container 106, such as an external frame 114, as shown in FIG. 2A or 2B or other type of frame. Basically, the frame is configured to provide structural integrity in setting, lifting such as with a crane, and stacking the container 106 with other containers in a line or array. The container 106 can be configured for receiving flowable waxy crude 112 into the internal chamber 108. In one aspect, the container 106 is devoid of an active heating system. The system 100 can also include a source refinery location 102 configured for producing the waxy crude 112. The system 100 can also include a filling system 104 configured for loading the waxy crude 112 into the container 106, which can be at the source refinery location 102. The system 100 can also include at least one transport vehicle 116 configured to carry the container 106. The system 100 also includes a transportation route 118 having a beginning 118a at the source refinery location 102 and an ending 118b, such as at a product refinery 122. The system 100 can include an emptying system 120 at the ending 118b (e.g., at the product refinery 122) of the transportation route 118. Accordingly, the system 100 can include a product refinery 122, wherein the emptying system 120 is at the product refinery 122. The container 106 can be airtight or includes at least one plug or cap for each at least one port.

In one embodiment, the system 100 can include a lift system 124 and at least one second transport vehicle 116a (e.g., another truck and trailer or a train car, such as flatbed). The lift system 124 and the at least one second transport vehicle 116a (e.g., train car) are located at a transfer location 126, such as at a rail station. The lift system 124 can include a crane configured for lifting the container 106. In one aspect, the lift system 124 includes a crane attached to at least one of the at least one transport vehicle 116 and/or at least one second transport vehicle 116a. In one aspect, the lift system 124 includes a crane located at one or more of: the refinery location 102, the filling system 104, at the emptying system 120, at the product refinery 122, and at the transfer location 126.

In one embodiment, the system 100 can include an active heating system 128 at the emptying system 120.

In one embodiment, the system 100 can include the container 106 having a passive heating system 130. In one aspect, the passive heating system 130 includes at least one of: a dark exterior on at least one surface of the container 106; a dark cover; a dark tent; a dark tarp; a dark frame; a dark outer container; or the like, wherein the dark is a color selected from black, dark grey, charcoal, brown, purple, blue, or combinations thereof. In one aspect, the passive heating system 130 includes at least one of: a black exterior on at least one surface of the container 106; a black cover; a black tent; a black tarp; a black frame; a black outer container; or the like.

In one embodiment, the container 106 includes an inlet port (e.g. 110) and an outlet port 132. The container 106 can include an inlet port (e.g. 110) at a top of the container 106 and an outlet port 132 at a bottom of the container 106.

In one embodiment, the system 100 can include a stack of a plurality of containers 106 or an array of a plurality of containers 106, wherein the plurality of containers 106 are coupled together.

In one embodiment, the source refinery location 102 includes a refinery configured for producing the waxy crude 112 from Uintah Basin. The "source" indicates it is the source of waxy crude hydrocarbon (e.g., oil, petroleum, etc.) that has been liberated from the ground. In one aspect, the waxy crude 112 is from Utah. In one aspect, the waxy crude 112 is in Uintah Basin, Utah, which is the beginning 118a. In one aspect, the waxy crude is refined from the Uintah Basin, Utah.

In one embodiment, the filling system 104 includes at least one pump 134 and at least one hose 136 for loading the waxy crude 112 into the container 106. The filling system 104 can include a heating system 138 configured to heat the waxy crude/waxy petroleum so as to be flowable.

In one embodiment, the at least one transport vehicle 116 includes a flat carrier bed 140. In one aspect, the at least one transport vehicle 116 includes a trailer 142 having a flat carrier bed 140. In one aspect, the at least one transport vehicle 116 includes at least one of: a flatbed truck; a truck and trailer; a semi and trailer; or the like.

In one embodiment, the transportation route includes a map showing the beginning 118a and ending 118b. The transportation route can include: one or more roads between the beginning 118a and ending 118b; one or more rail lines between the beginning 118a and ending 118b; one or more waterway travel routes between the beginning 118a and ending 118b; one or more ocean travel routes between the beginning 118a and ending 118b; or combination thereof.

In one embodiment, the system 100 can include a navigation system 144, such as a GPS, navigation device, smartphone with GPS and/or navigation application, or the like.

The heating system 128 at the emptying system 120 is configured to heat the solidified (e.g., cooled, non-flowable) waxy crude 112 to a flowable state. In one aspect, the heating system 128 is configured to heat the waxy crude 112 to at least its melting point. In one aspect, the active heating system 128 includes one or more heating resistive elements. The active heating system 128 can include one or more fuel burning units. The active heating system 128 is configured to heat the body of the container 106. The active heating system 128 includes one or more members adapted to be inserted through a port of the container 106 so as to heat the waxy crude/waxy petroleum by direct heat contact. The active heating system 128 can omit exposing the waxy crude/waxy petroleum to flame.

In one embodiment, the emptying system 120 includes one or more pumps 134 and/or one or more hoses 136.

In one embodiment, the container 106 includes a frame 114 adapted for stacking framed containers. The container 106 can include a frame 114 adapted for being lifted with the lift system 124.

In one embodiment, the system 100 can include solidified and/or non-flowable waxy crude 112 in the internal chamber 108.

In one embodiment, the at least one transport vehicle 116 includes a trailer 300 configured to be pulled by a motorized and/or engine driven vehicle. In one aspect, the at least one transport vehicle 116 includes a flatbed train car 302 configured to be pulled by a motorized and/or engine driven train.

As also shown in FIG. 1, a method of transporting waxy crude 112 is provided. The method can include providing a container 106 having an internal chamber 108 with at least one port (e.g., top port 110), and having a frame 114 around the container 106, the container 106 being configured for receiving flowable waxy crude 112 into the internal chamber 108, wherein the container 106 is devoid of an active heating system, wherein the container 106 is provided at a refinery location 102 configured for producing the waxy crude 112. The method can also include filling the internal chamber 108 of the container 106 with a filling system 104 configured for loading the waxy crude 112 into the container 106. The method can also include transporting the container 106 having the waxy crude 112 with at least one transport vehicle 116 configured to carry the container 106, wherein the transporting is performed without actively heating the waxy crude 112 with an active heating system, wherein the transporting is along a transportation route 118 having a beginning 118a at the refinery location 102 and an ending 118b. The method can also include heating the waxy crude 112 at the ending 118b of the transportation route 118 until flowable, the heating being with a passive heating system 130 or an active heating system 128. The method can also include removing the flowable waxy crude 112 from the container 106 with the emptying system 120 at the ending 118b of the transportation route 118.

In one embodiment, the method can include providing the flowable waxy crude 112 to a product refinery 122 with the emptying system 120.

In one embodiment, the method can include lifting the container 106 having the waxy crude 112 from a first transport vehicle 116 with a lift system 124 and placing the container 106 having the waxy crude 112 on a second transport vehicle 116a. In one aspect, the method can include the lift system 124 lifting the container 106 having the waxy crude/waxy petroleum at a transfer location 126. In one aspect, the method can include operating the lift system 124 that includes a crane configured for lifting the container 106. In one aspect, the lift system 124 includes a crane attached to at least one of the at least one transport vehicle 116 and/or at least one second transport vehicle 116a. In one aspect, the lift system 124 includes a crane located at one or more of: the refinery location 102, the filling system 104, at the emptying system 120, at the product refinery 122, and at the transfer location 126. In one aspect, the container 106 includes a frame 114 adapted for stacking framed containers. In one aspect, the method includes comprising moving the container 106 by using the lift system 124 to attach to the frame 114 that is adapted for being lifted with the lift system 124.

In one embodiment, the method can include operating the active heating system 128 at the emptying system 120 so as to heat solid and/or non-flowable waxy crude 112 into flowable waxy crude 112. In one aspect, the method can include heating the container 106 with the passive heating system 130 during transport or at the emptying system 120. In one aspect, the method can include heating the container 106 with the passive heating system 130, which includes at least one of: a dark exterior on at least one surface of the container 106; a dark cover; a dark tent; a dark tarp; a dark frame; a dark outer container; or the like, wherein the dark is a color selected from black, dark grey, charcoal, brown, purple, blue, or combinations thereof. In one aspect, the method can include heating the container 106 with the passive heating system 130, which includes at least one of: a black exterior on at least one surface of the container 106; a black cover; a black tent; a black tarp; a black frame; a black outer container; or the like.

In one embodiment, the method can include filling the container 106 via an inlet port (e.g. 110), and emptying the container 106 via an outlet port 132. In one aspect, the method can include filling the container 106 via an inlet port (e.g. 110) at a top of the container 106, and emptying the container via an outlet port 132 at a bottom of the container 106.

In one embodiment, the method can include forming a stack of a plurality of containers 106 or an array of a plurality of containers 106, wherein the plurality of containers 106 are coupled together, wherein the stack optionally is on the at least one transport vehicle 116.

In one embodiment, the method can include receiving the waxy crude 112 from the refinery location 102, which includes a refinery configured for producing the waxy crude 112. In one aspect, the method can include the refinery location 102 and filling system 104 being located in Utah, such that the waxy crude 112 is from Utah deposits. In one aspect, the refinery location 102 and filling system 104 are located in Uintah Basin, Utah, which is the beginning 118a. In one aspect, the waxy crude 112 is refined from Uintah Basin, Utah.

In one embodiment, the method can include operating the filling system 104 by operating at least one pump 134 and at least one hose 136 for loading the waxy crude 112 into the container 106. In one aspect, the filling system 104 includes a heating system 138 configured to heat the waxy crude/waxy petroleum so as to be flowable.

In one embodiment, the method can include carrying the container 106 having non-actively heated waxy crude/waxy petroleum on a flat carrier bed 140 of the at least one transport vehicle 116. In one aspect, the at least one transport vehicle 116 includes a trailer 142 having a flat carrier bed 140. In one aspect, the at least one transport vehicle 116 includes at least one of: a flatbed truck; a truck and trailer; a semi and trailer; or the like.

In one embodiment, the transportation route includes a map showing the beginning 118a and ending 118b, the method comprising following the transportation route from the beginning 118a to the ending 118b. The transportation route can include: one or more roads between the beginning 118a and ending 118b; one or more rail lines between the beginning 118a and ending 118b; one or more waterway travel routes between the beginning 118a and ending 118b; one or more ocean travel routes between the beginning 118a and ending 118b; or combination thereof.

In one embodiment, the method can include operating a navigation system 144, such as a GPS, navigation device, smartphone with GPS and/or navigation application, or the like during the transporting along the transportation route.

In one embodiment, the method can include after filling the container 106 with the waxy crude 112, sealing the container 106 so as to be airtight, such as by placing at least one plug or cap for each at least one port or closing a valve.

In one embodiment, the method can include operating the heating system 128 at the emptying system 120 so as to heat the waxy crude 112 to a flowable state. In one aspect, the method can include operating the heating system 128 so as to heat the waxy crude 112 to at least its melting point. In one aspect, the method includes heating the waxy crude 112 with the active heating system 128 that includes one or more electrical heating resistive elements at the emptying system 120. In one aspect, the active heating system 128 includes one or more fuel burning units. In one aspect, the method can include the active heating system 128 heating the body of the container 106. In one aspect, the method can include operating the active heating system 128 so that one or more heating members are inserted through a port of the container 106 so as to heat the waxy crude 112 by direct heat contact. In one aspect, the method specifically excludes the active heating system 128 exposing the waxy crude/waxy petroleum to flame.

In one embodiment, the method includes operating the emptying system 120 by operating one or more pumps 134 and flowing the flowable waxy crude/waxy petroleum through one or more hoses 136.

In one embodiment, the method can include maintaining the solidified and/or non-flowable waxy crude 112 in the internal chamber 108 during the transportation from the beginning 118a to the ending 118b. In one aspect, the method includes operating the at least one transport vehicle 116 having the container 106 with the waxy crude 112 that includes a trailer 300 configured to be pulled by a motorized and/or engine driven vehicle.

In one aspect, the method includes operating the at least one transport vehicle 116 having the container 106 with the waxy crude 112 that includes a flatbed train car 302 configured to be pulled by a motorized and/or engine driven train.

In some embodiments, the non-heated liquid container can be a standard liquid container configured for holding a large capacity (e.g., 24,600-24,700 liters) of substance.

The waxy crude/waxy petroleum can be from the Uintah Basin as described herein, which is a yellow or blackish crude/waxy petroleum. The yellow waxy crude can have a typical API gravity of 42 degrees (e.g., pour point of 120° F.), and the black waxy crude can have a typical API of 32 degrees (e.g., pour point of 105° F.). As such, the transportation can be at temperatures lower than the pour points, which is the temperature at which the crude begins to flow.

The waxy crude/waxy petroleum can be a waxy petroleum that is solidified to the non-flowable state. Thus, the waxy crude/waxy petroleum is transported in the non-flowable state.

The waxy crude/waxy petroleum may include butane (60-90%), propane (15-35%), isobutane (15-35%), isopentane (2-12%), and pentane (less than or about 2.5%).

The solidified waxy crude/waxy petroleum can have a waxy solid appearance, which may be white to yellowish in color. Some may have the blackish color. The solidified waxy crude/waxy petroleum can have a flash point of at least or about 275° F., at least or about 285° F., at least or about 295° F., or at least or about 298° F. (e.g., 298.4° F., or about 300° F.). The higher flashpoint, compared to liquid waxy crude/waxy petroleum, is economically favorable due to lower shipping rates and lower costs to perform the shipping because the container is not actively heated. Active heating of these containers is significantly expensive. Now that the waxy crude/waxy petroleum can be shipped while solidified and then only liquified prior to removal, the overall cost of the shipping is significantly reduced. It has been found that the solidified waxy crude/waxy petroleum can be economically heated at the point of delivery until flowable in order to remove it from the container.

The solidified waxy crude/waxy petroleum can have an ignition temperature of at least or about 689° F., and thereby can be "not self-igniting" or "not explosive". The waxy crude/waxy petroleum can be miscible with water. The waxy crude/waxy petroleum can have at least or about 82.7% solvents, and at least or about 80% VOC content.

In some embodiments, only the waxy crude/waxy petroleum from the Uintah Basin can be used and transported in the cooled and solidified state. However, the invention may use solidified/waxy petroleum from other locations.

In some embodiments, a system for transporting waxy crude/waxy petroleum can include: a container having an internal chamber with at least one port, and having a frame around the container, the container being configured for receiving flowable waxy crude/waxy petroleum into the internal chamber, wherein the container is devoid of an active heating system; non-flowable waxy crude/waxy petroleum in the container, such as when in transportation; a refinery location configured for producing the waxy crude/waxy petroleum; a filling system at the refinery location that is configured for loading the waxy crude/waxy petroleum into the container; at least one transport vehicle configured to carry the container; a transportation route having a beginning at the refinery location and an ending; and an emptying system at the ending of the transportation route, the emptying system comprising a heating system configured to heat the non-flowable waxy crude/waxy petroleum into a flowable state. In some aspects, the system can include a product refinery, wherein the emptying system is at the product refinery. In some aspects, the system can include a lift system and at least one second transport vehicle. In some aspects, the lift system and the at least one second transport vehicle are located at a transfer location. In some aspects, solidified and/or non-flowable waxy crude/waxy petroleum is in the internal chamber, where the container is sealed airtight or unsealed and not airtight.

In some embodiments, the system can include an active heating system at the emptying system. Also, the emptying system can include a passive heating system.

In some embodiments, the container includes a passive heating system. The passive heating system includes at least one of: a dark exterior on at least one surface of the container; a dark cover; a dark tent; a dark tarp; a dark frame; a dark outer container; or the like, wherein the dark is a color selected from black, dark grey, charcoal, brown, purple, blue, or combinations thereof. In some aspects, the passive heating system includes at least one of: a black exterior on at least one surface of the container; a black cover; a black tent; a black tarp; a black frame; a black outer container; or the like.

In some embodiments, the container includes an inlet port and an outlet port. In some aspects, the container includes an inlet port at a top of the container and an outlet port at a bottom of the container.

In some embodiments, the system can include a stack of a plurality of containers or an array of a plurality of containers, wherein the plurality of containers are coupled together. The containers can include the solidified waxy crude/waxy petroleum, during transportation or storage.

In some embodiments, the refinery location includes a refinery configured for producing the waxy crude/waxy petroleum. In some aspects, the waxy crude/waxy petroleum is from Utah. In some aspects, the waxy crude/waxy petroleum is from Uintah Basin, Utah, which is the beginning of a transportation route. In some aspects, the waxy crude/waxy petroleum is refined from Uintah Basin, Utah.

In some embodiments, the filling system includes at least one pump and at least one hose for loading the flowable waxy crude/waxy petroleum into the container. In some aspects, the filling system includes a heating system configured to heat the waxy crude/waxy petroleum so as to be flowable.

In some embodiments, the at least one transport vehicle includes a flat carrier bed. In some aspects, the at least one transport vehicle includes a trailer having a flat carrier bed. In some aspects, the at least one transport vehicle includes at least one of: a flatbed truck; a truck and trailer; a semi and trailer; or the like.

In some embodiments, the transportation route includes a map showing the beginning and ending. In some aspects, the transportation route includes: one or more roads between the beginning and ending; one or more rail lines between the beginning and ending; one or more waterway travel routes between the beginning and ending; one or more ocean travel routes between the beginning and ending; or combination thereof. In some aspects, the system includes a navigation system, such as a GPS, navigation device, smartphone with GPS and/or navigation application, or the like.

In some embodiments, the container is airtight or includes at least one plug or cap or valve for each at least one port. Accordingly, the container can be closed and sealed airtight, or opened to allow gasses to escape, such as during transportation or storage.

In some embodiments, the system can include a lift system that has a crane configured for lifting the container. In some aspects, the lift system includes a crane attached to at least one of the at least one transport vehicle and/or at least one second transport vehicle. In some aspects, the lift system includes a crane located at one or more of: the refinery location, the filling system, at the emptying system, at the product refinery, and at the transfer location.

In some embodiments, the heating system at the end of the transportation route (e.g., at a product refinery) is configured to heat the waxy crude/waxy petroleum to a flowable state. In some aspects, the heating system is configured to heat the waxy crude/waxy petroleum to at least its melting point. In some aspects, the active heating system includes one or more heating resistive elements. In some aspects, the active heating system includes one or more fuel burning units. In some aspects, the active heating system is configured to heat the body of the container. In some aspects, the active heating system includes one or more members adapted to be inserted through a port of the container so as to heat the waxy crude/waxy petroleum by direct heat contact. In some aspects, the active heating system omits exposing the waxy crude/waxy petroleum to flame.

In some embodiments, the active heating system can be part of an emptying system to empty the container that has shipped the solidified waxy crude/waxy petroleum. In some aspects, the emptying system includes one or more pumps and/or one or more hoses.

In some embodiments, the container includes a frame adapted for stacking framed containers. In some aspects, the container includes a frame adapted for being lifted with the lift system.

In some embodiments, the at least one transport vehicle includes a trailer configured to be pulled by a motorized and/or engine driven vehicle. In some aspects, the at least one transport vehicle includes a flatbed train car configured to be pulled by a motorized and/or engine driven train.

In some embodiments, a method of transporting waxy crude/waxy petroleum can include: providing a container having an internal chamber with at least one port, and having a frame around the container, the container being configured for receiving flowable waxy crude/waxy petroleum into the internal chamber, wherein the container is devoid of an active heating system, wherein the container is provided at a refinery location configured for producing the waxy crude/waxy petroleum; filling the internal chamber of the container with a filling system configured for loading the waxy crude/waxy petroleum into the container; allowing the waxy crude/waxy petroleum to cool and solidify into non-flowable waxy crude/waxy petroleum; transporting the container having the non-flowable waxy crude/waxy petroleum with at least one transport vehicle configured to carry the container, wherein the transporting is performed without actively heating the waxy crude/waxy petroleum with an active heating system, wherein the transporting is along a transportation route having a beginning at the refinery location and an ending; heating the non-flowable waxy crude/waxy petroleum at the ending of the transportation route until flowable, the heating being with a passive heating system or an active heating system; and removing the flowable waxy crude/waxy petroleum from the container with the emptying system at the ending of the transportation route. In some aspects, the method can include providing the flowable waxy crude/waxy petroleum to a product refinery with the emptying system. In some aspects, the method can include maintaining the solidified and/or non-flowable waxy crude/waxy petroleum in the internal chamber during the transportation from the beginning to the ending.

In some embodiments, the method can include lifting the container having the waxy crude/waxy petroleum from a first transport vehicle with a lift system and placing the container having the waxy crude/waxy petroleum on a second transport vehicle. In some aspects, the lift system lifts the container having the waxy crude/waxy petroleum at a transfer location. In some aspects, the method can include forming a stack of a plurality of containers or an array of a plurality of containers, wherein the plurality of containers are coupled together, wherein the stack optionally is on the at least one transport vehicle.

In some embodiments, the method can include operating the active heating system at the emptying system so as to heat solid and/or non-flowable waxy crude/waxy petroleum into flowable waxy crude/waxy petroleum. In some aspects, the method can include heating the container with the passive heating system during transport or at the emptying system. In some aspects, the method can include heating the container with the passive heating system, which includes at least one of: a dark exterior on at least one surface of the container; a dark cover; a dark tent; a dark tarp; a dark frame; a dark outer container; or the like, wherein the dark is a color selected from black, dark grey, charcoal, brown, purple, blue, or combinations thereof. In some aspects, the method can include heating the container with the passive heating system, which includes at least one of: a black exterior on at least one surface of the container; a black cover; a black tent; a black tarp; a black frame; a black outer container; or the like.

In some embodiments, the method can include filling the container via an inlet port, and emptying the container via an outlet port. In some aspects, the method can include: filling the container via an inlet port at a top of the container; and emptying the container via an outlet port at a bottom of the container. In some embodiments, the method can include operating the filling system by operating at least one pump and at least one hose for loading the waxy crude/waxy petroleum into the container. In some aspects, the filling system includes a heating system configured to heat the waxy crude/waxy petroleum so as to be flowable.

In some embodiments, the method can include receiving the waxy crude/waxy petroleum from the refinery location, which includes a refinery configured for producing the waxy crude/waxy petroleum. In some aspects, the refinery location and filling system are located in Utah, such that the waxy crude/waxy petroleum is from Utah. In some aspects, the refinery location and filling system are located in Uintah Basin, Utah, which is the beginning. In some aspects, the waxy crude/waxy petroleum is refined from formations of Uintah Basin, Utah.

In some embodiments, the method can include carrying the container having non-actively heated waxy crude/waxy petroleum on a flat carrier bed of the at least one transport vehicle. In some aspects, the at least one transport vehicle includes a trailer having a flat carrier bed. In some aspects, the at least one transport vehicle includes at least one of: a flatbed truck; a truck and trailer; a semi and trailer; or the like.

In some embodiments, the transportation route includes a map showing the beginning and ending, the method comprising following the transportation route from the beginning to the ending. In some aspects, the transportation route includes: one or more roads between the beginning and ending; one or more rail lines between the beginning and ending; one or more waterway travel routes between the beginning and ending; one or more ocean travel routes between the beginning and ending; or combination thereof.

In some aspects, the method can include operating a navigation system, such as a GPS, navigation device, smartphone with GPS and/or navigation application, or the like during the transporting along the transportation route.

In some embodiments, after filling the container with the waxy crude/waxy petroleum, the method can include sealing the container so as to be airtight, such as by placing at least one plug or cap for each at least one port or closing a valve.

In some embodiments, the method can include operating the lift system that includes a crane configured for lifting the container. In some aspects, the lift system includes a crane attached to at least one of the at least one transport vehicle and/or at least one second transport vehicle. In some aspects, the lift system includes a crane located at one or more of: the refinery location, the filling system, at the emptying system, at the product refinery, and at the transfer location. In some aspects, the container includes a frame adapted for stacking framed containers, and the method can include moving the container by using the lift system to attach to the frame that is adapted for being lifted with the lift system.

In some embodiments, the removal of the waxy crude/waxy petroleum includes heating until flowable and flowing the substance from the container. In some aspects, the method can include operating the heating system at the emptying system so as to heat the waxy crude/waxy petroleum to a flowable state. In some aspects, the method can include operating the heating system so as to heat the waxy crude/waxy petroleum to at least its melting point. In some aspects, the method can include heating the waxy crude/waxy petroleum with the active heating system that includes one or more electrical heating resistive elements at the emptying system. In some aspects, the active heating system includes one or more fuel burning units. In some aspects, the active heating system is configured for heating the body of the container. In some aspects, the method can include operating the active heating system so that one or more heating members are inserted through a port of the container so as to heat the waxy crude/waxy petroleum by direct heat contact.

In some embodiments, the method specifically excludes the active heating system exposing the waxy crude/waxy petroleum to flame.

In some aspects, the method can include operating the emptying system by operating one or more pumps and flowing the flowable waxy crude/waxy petroleum through one or more hoses.

In some aspects, the method can include operating the at least one transport vehicle having the container with the waxy crude/waxy petroleum that includes a trailer configured to be pulled by a motorized and/or engine driven vehicle. In some aspects, the method can include operating the at least one transport vehicle having the container with the waxy crude/waxy petroleum that includes a flatbed train car configured to be pulled by a motorized and/or engine driven train.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. A system for transporting waxy crude hydrocarbon, the system comprising:
   a container having an internal chamber with at least one port, and having a frame around the container, the container being configured for receiving flowable waxy crude hydrocarbon into the internal chamber and allowing the flowable waxy crude hydrocarbon to cool and solidify into non-flowable waxy crude hydrocarbon, wherein the container is devoid of an active heating system;
   a refinery location configured for producing the waxy crude hydrocarbon;
   a filling system at the refinery location that is configured for loading the waxy crude hydrocarbon into the container;
   the non-flowable waxy crude hydrocarbon in the container;
   at least one transport vehicle configured to carry the container;
   a transportation route having a beginning at the refinery location and an ending; and
   an emptying system at the ending of the transportation route, the emptying system comprising a heating system configured to heat the non-flowable waxy crude hydrocarbon into a flowable state.

2. The system of claim 1 further comprising a lift system and at least one second transport vehicle, wherein the lift system and the at least one second transport vehicle are located at a transfer location.

3. The system of claim 1, further comprising an active heating system at the emptying system.

4. The system of claim 1, wherein the container includes a passive heating system.

5. The system of claim 1, wherein the waxy crude hydrocarbon is refined from Uintah Basin, Utah, which is the beginning of the transportation route.

6. The system of claim 1, wherein the filling system and/or emptying system includes at least one pump and at least one hose for loading the flowable waxy crude hydrocarbon into the container.

7. A method of transporting waxy crude hydrocarbon, the method comprising:
   providing a container having an internal chamber with at least one port, and having a frame around the container, the container being configured for receiving flowable waxy crude into the internal chamber, wherein the container is provided at a refinery location configured for producing the waxy crude hydrocarbon;
   filling the internal chamber of the container with a filling system configured for loading the waxy crude hydrocarbon into the container;
   allowing the waxy crude hydrocarbon to cool and solidify into a non-flowable state;
   transporting the container having the non-flowable waxy crude hydrocarbon with at least one transport vehicle configured to carry the container, wherein the transporting is performed without actively heating the waxy crude hydrocarbon with an active heating system, wherein the transporting is along a transportation route having a beginning at the refinery location and an ending;
   heating the waxy crude hydrocarbon at the ending of the transportation route until flowable; and
   removing the flowable waxy crude hydrocarbon from the container with an emptying system at the ending of the transportation route.

8. The method of claim 7, further comprising lifting the container having the waxy crude hydrocarbon from a first transport vehicle with a lift system and placing the container having the waxy crude hydrocarbon on a second transport vehicle, wherein the lift system lifts the container having the waxy crude hydrocarbon at a transfer location.

9. The method of claim 7, further comprising operating an active heating system at the emptying system so as to heat the non-flowable waxy crude hydrocarbon into flowable waxy crude hydrocarbon.

10. The method of claim 7, further comprising heating the container with a passive heating system during transport or at the emptying system, which passive heating system includes at least one of: a dark exterior on at least one surface of the container; a dark cover; a dark tent; a dark tarp; a dark frame; a dark outer container; or the like, wherein the dark is a color selected from black, dark grey, charcoal, brown, purple, blue, or combinations thereof.

11. The method of claim 7, further comprising forming a stack of a plurality of containers or an array of a plurality of containers, wherein the plurality of containers are coupled together, wherein the stack optionally is on the at least one transport vehicle.

12. The method of claim 7, further comprising receiving the waxy crude hydrocarbon from the refinery location, which includes a refinery configured for producing the waxy crude hydrocarbon from Uintah Basin, Utah.

13. The method of claim 7, further comprising operating the filling system by operating at least one pump and at least one hose for loading the waxy crude hydrocarbon into the container.

14. The method of claim 13, wherein the filling system includes a heating system configured to heat the waxy crude hydrocarbon so as to be flowable.

15. The method of claim 7, wherein the at least one transport vehicle includes a trailer or rail car having a flat carrier bed.

16. The method of claim 7, wherein the transportation route includes: one or more roads between the beginning and ending; one or more rail lines between the beginning and ending; one or more waterway travel routes between the beginning and ending; one or more ocean travel routes between the beginning and ending; or combination thereof.

17. The method of claim 7, further comprising: after filling the container with the waxy crude hydrocarbon, sealing the container so as to be airtight.

18. The method of claim 7, further comprising operating an active heating system at the emptying system so as to heat the waxy crude hydrocarbon to a flowable state.

19. The method of claim 18, further comprising:
- the active heating system heating the body of the container; and/or
- one or more heating members are inserted through a port of the container so as to heat the waxy crude hydrocarbon by direct heat contact.

20. The method of claim 7, comprising maintaining the non-flowable waxy crude hydrocarbon in the internal chamber during the transportation from the beginning to the ending.

\* \* \* \* \*